(12) United States Patent
Oguma et al.

(10) Patent No.: US 6,568,176 B2
(45) Date of Patent: May 27, 2003

(54) ENGINE EXHAUST PURIFICATION DEVICE

(75) Inventors: Hajime Oguma, Zama (JP); Takeshi Nakamura, Yokohama (JP)

(73) Assignee: Nissan Motor Co., Ltd., Yokohama (JP)

(\*) Notice: Subject to any disclaimer, the term of this patent is extended or adjusted under 35 U.S.C. 154(b) by 82 days.

(21) Appl. No.: 09/789,014

(22) Filed: Feb. 21, 2001

(65) Prior Publication Data
US 2001/0022082 A1 Sep. 20, 2001

(30) Foreign Application Priority Data

Feb. 22, 2000 (JP) ........................................ 2000-044725
Feb. 15, 2001 (JP) ........................................ 2001-038145

(51) Int. Cl.$^7$ ................................................ F01N 3/00
(52) U.S. Cl. ............................ 60/285; 60/274; 60/277; 60/276
(58) Field of Search ........................... 60/274, 276, 277, 60/285, 284

(56) References Cited

U.S. PATENT DOCUMENTS

| | | | | |
|---|---|---|---|---|
| 5,609,023 A | \* | 3/1997 | Katoh et al. .................. | 60/276 |
| 5,842,340 A | | 12/1998 | Bush et al. .................... | 60/274 |
| 5,848,528 A | \* | 12/1998 | Liu ................................ | 60/274 |
| 5,901,552 A | | 5/1999 | Schnaibel et al. ............. | 60/274 |
| 6,185,933 B1 | \* | 2/2001 | Tsuzuki et al. ................ | 60/285 |
| 6,289,673 B1 | \* | 9/2001 | Tayama et al. ................ | 60/285 |

FOREIGN PATENT DOCUMENTS

JP          9-228873          9/1997

\* cited by examiner

*Primary Examiner*—Thomas Denion
*Assistant Examiner*—Binh Tran
(74) *Attorney, Agent, or Firm*—Foley & Lardner

(57) ABSTRACT

A controller computes an oxygen storage amount of a catalyst based on the characteristics of an exhaust flowing into the catalyst, and controls the air-fuel ratio of an engine so that the oxygen storage amount of the catalyst is a target value. When it is determined that the engine starts from the warmed-up state when the engine starts, the air-fuel ratio of the engine is controlled to rich until the exhaust flowing out of the catalyst becomes rich. In this way, all the oxygen stored by the catalyst is first released, the NOx purification performance of the catalyst is maintained, and the NOx release amount immediately after engine startup is suppressed.

11 Claims, 13 Drawing Sheets

ENGINE EXHAUST PURIFICATION DEVICE

FIELD OF THE INVENTION

The present invention relates to an engine exhaust purification device provided with a catalyst.

BACKGROUND OF THE INVENTION

JP-A-H9-228873 published by the Japanese Patent Office in 1997 discloses a technique wherein an oxygen amount stored in a three-way catalyst (hereafter, "oxygen storage amount") is estimated based on an engine intake air amount and an air fuel ratio of an exhaust flowing into the catalyst, and engine air-fuel ratio control is performed so that the oxygen storage amount of the catalyst is constant.

To maintain the NOx (nitrogen oxides), CO and HC (hydrocarbon) conversion efficiency of the three-way catalyst at a maximum, the catalyst atmosphere must be maintained at the stoichiometric air-fuel ratio. If the oxygen storage amount of the catalyst is maintained constant, oxygen in the exhaust is stored in the catalyst even if the air-fuel ratio of the exhaust flowing into the catalyst temporarily becomes lean, and conversely, oxygen stored in the catalyst is released even if the air-fuel ratio of the exhaust flowing into the catalyst temporarily becomes rich, so the catalyst atmosphere can be maintained at the stoichiometric air-fuel ratio.

Therefore, in an exhaust purification device performing this type of control, it is required to calculate the oxygen storage amount precisely to maintain the conversion efficiency of the catalyst at a high level, and various methods of computing the oxygen storage amount have been proposed.

SUMMARY OF THE INVENTION

However, even if the oxygen storage amount can be precisely computed, if the catalyst temperature on engine restart is high such as when the elapsed time from when the engine stopped on the immediately preceding occasion is short, NOx tends to be easily released.

This is due to the fact that, if the catalyst temperature on engine startup is high, the catalyst has already stored a large amount of oxygen which has entered from the exhaust passage outlet and diffused in the exhaust passage, so the NOx purification performance of the catalyst decreases. When the oxygen storage amount of the catalyst is large, and the air-fuel ratio of the inflowing exhaust is shifted to lean, the catalyst atmosphere cannot be corrected to the stoichiometric air-fuel ratio, and NOx in the exhaust cannot be completely purified.

It is therefore an object of this invention to suppress the NOx release amount on engine startup in an exhaust purification device which controls the air-fuel ratio of an engine to maintain the oxygen storage amount of a catalyst at a fixed level.

In order to achieve above object, this invention provides an exhaust purification device for an engine, comprising a first catalyst provided in an exhaust passage of the engine, a front sensor which detects the characteristics of the exhaust flowing into the first catalyst, and a microprocessor programmed to determine whether the engine starts up from a warmed-up state when the engine starts, control the air-fuel ratio of the engine to rich until the exhaust flowing out from the first catalyst has become rich when it is determined that the engine starts up from the warnmed-up state, compute the oxygen storage amount of the first catalyst based on the characteristics of the exhaust flowing into the first catalyst, and control the air-fuel ratio of the engine based on the computed oxygen storage amount so that the oxygen storage amount of the first catalyst is a target value.

According to an aspect of the invention, this invention provides an exhaust purification device for an engine, comprising a first catalyst provided in an exhaust passage of the engine, a second catalyst provided downstream of the first catalyst, a front sensor which detects the characteristics of the exhaust flowing into the first catalyst, and a microprocessor programmed to determine whether the engine starts up from a warmed-up state when the engine starts, control the air-fuel ratio of the engine to rich until the exhaust flowing out from the second catalyst has become rich when it is determined that the engine starts from the warmed-up state, compute the oxygen storage amount of the first catalyst based on the characteristics of the exhaust flowing into the first catalyst, and control the air-fuel ratio of the engine based on the computed oxygen storage amount so that the oxygen storage amount of the first catalyst is a target value.

The details as well as other features and advantages of this invention are set forth in the remainder of the specification and are shown in the accompanying drawings.

Strictly speaking, noble metals adsorb oxygen in the molecular state, and oxygen storage materials absorb oxygen as compounds, but in the following description, adsorption and absorption will be collectively referred to as storage.

Further, the expression "the exhaust air-fuel ratio is rich" means that the oxygen concentration in the exhaust is lower than the oxygen concentration in the exhaust when the engine is running at the stoichiometric air-fuel ratio, and the expression "the exhaust air-fuel ratio is lean" means that the oxygen concentration in the exhaust is higher than the oxygen concentration in the exhaust when the engine is running at the stoichiometric air-fuel ratio. The expression "the exhaust air-fuel ratio is stoichiometric" means that the oxygen concentration of the exhaust is equal to the oxygen concentration in the exhaust when the engine is running at the stoichiometric air-fuel ratio.

DESCRIPTION OF THE PREFERRED EMBODIMENTS

Figure 1:
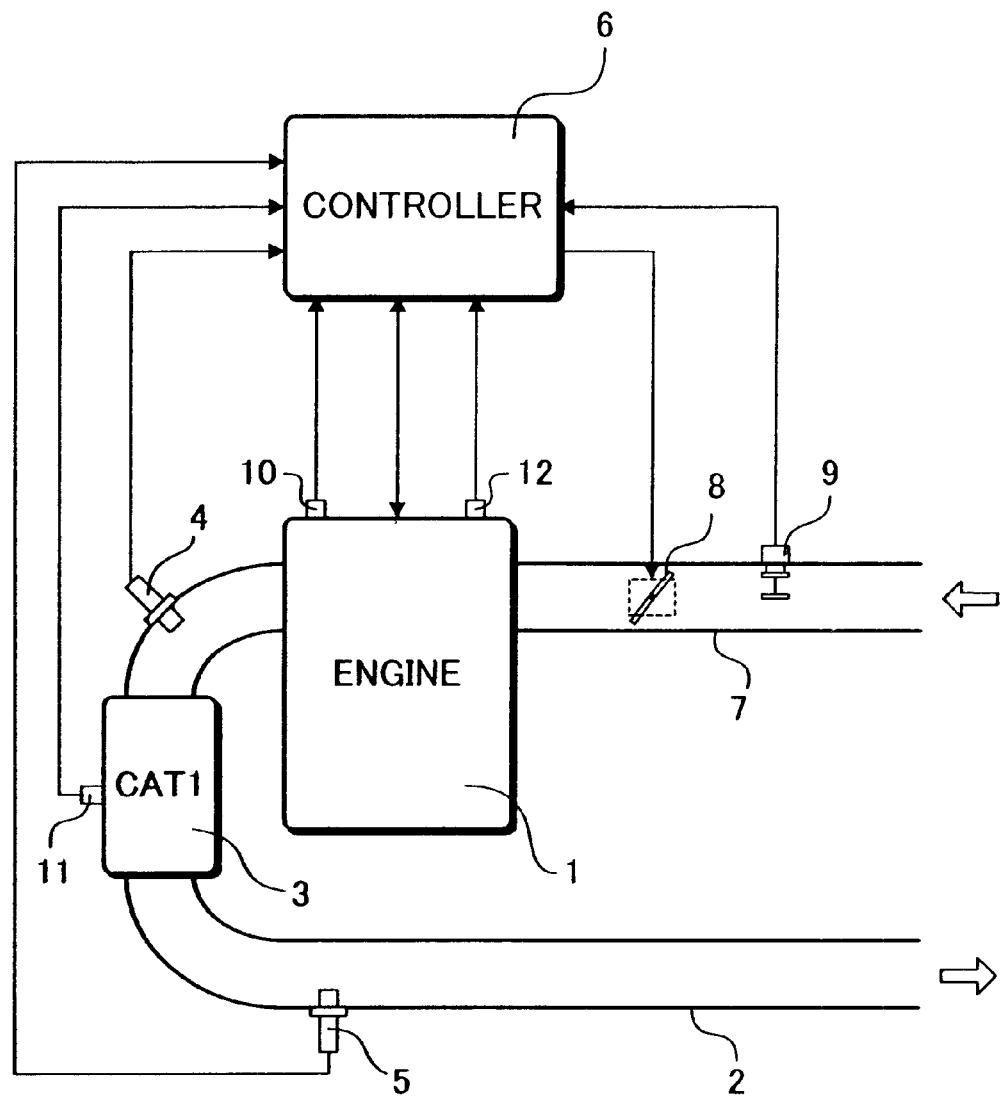
FIG. 1 is a schematic diagram of an exhaust purification device according to this invention.

Referring to FIG. 1 of the drawings, an exhaust passage 2 of an engine 1 is provided with a catalyst 3, front wide range air-fuel ratio sensor 4 (hereafter referred to as front A/F sensor), rear oxygen sensor 5 and controller 6.

A throttle 8, and an air flow meter 9 which detects the intake air amount adjusted by the throttle 8, are provided in an intake passage 7 of the engine 1. In addition, a crank angle sensor 12 which detects the engine rotation speed of the engine 1 is provided.

The catalyst 3 is a catalyst having a three-way catalyst function. The catalyst 3 purifies NOx, HC and CO with maximum efficiency when the catalyst atmosphere is at the stoichiometric air-fuel ratio. The catalyst carrier of the catalyst 3 is coated with an oxygen storage material such as cerium oxide, and the catalyst 3 has the function of storing or releasing oxygen according to the air-fuel ratio of the inflowing exhaust (referred to hereafter as oxygen storage function).

Here, the oxygen storage amount of the catalyst 3 may be partitioned into a high speed component HO2 which is stored and released by a noble metal in the catalyst 3 (Pt, Rh, Pd), and a low speed component LO2 which is stored and released by the oxygen storage material in the catalyst 3. The low speed component LO2 represents the storage and release of a larger amount of oxygen than the high speed component HO2, but its storage/release rate is slower than that of the high speed component HO2.

Further, this high speed component HO2 and low speed component LO2 have char chacteristics as follows:

When oxygen is stored, oxygen is stored preferentially as the high speed component HO2, and begins to be stored as the low speed component LO2 when the high speed component HO2 has reached a maximum capacity HO2MAX and can no longer be stored.

When oxygen is released, and the ratio of the low speed component LO2 to the high speed component HO2 (LO2/HO2) is less than a predetermined value, i.e. when the high speed component is relatively large, oxygen is preferentially released from the high speed component HO2, and when the ratio of the low speed component LO2 to the high speed component HO2 is larger than the predetermiined value, oxygen is released from both the high speed component HO2 and low speed component LO2 so that the ratio of the low speed component LO2 to the high speed component HO2 does not vary.

Figure 2:
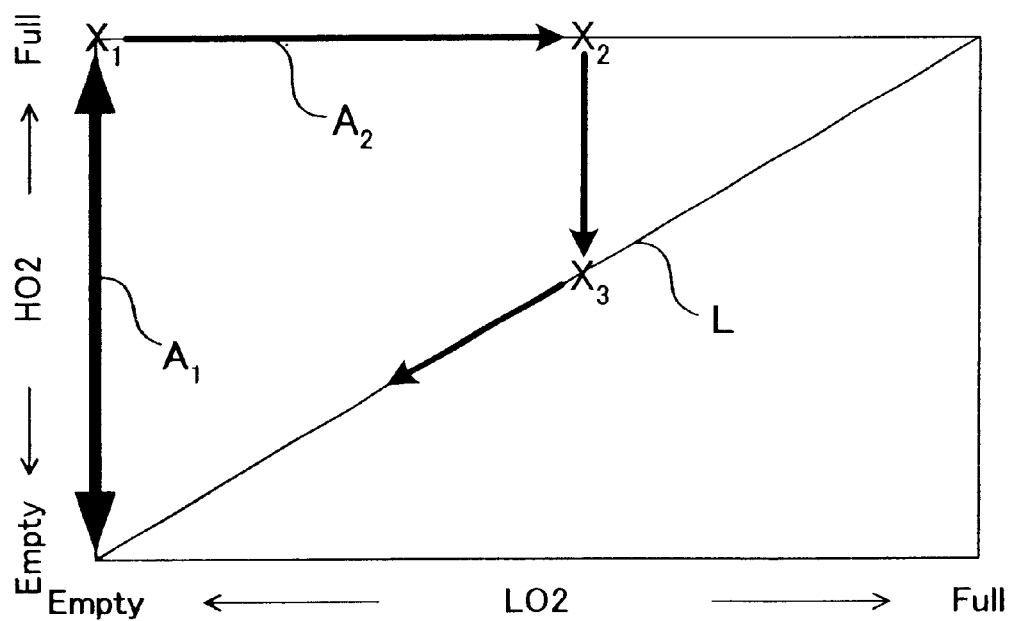
FIG. 2 is a diagram showing the oxygen storage/release characteristics of a catalyst.

FIG. 2 shows the oxygen storage/release characteristics of the catalyst. The vertical axis shows the high speed component HO2 (oxygen amount stored in the noble metal) and the horontal axis shows the low speed component LO2 (oxygen amount stored in the oxygen storage material).

In the normal running condition, the low speed component LO2 is almost zero and only the high speed component HO2 varies according to the air-fuel ratio of the exhaust flowing into the catalyst as shown as the arrow $A_1$ in the Figure. The high speed component HO2 is controlled, for example, to be half of its maximum capacity.

However, when the engine fuel cut has performed or when the engine has restarted from the warmed-up state (hot restart), the high speed component HO2 has reached its maximum capacity and oxygen is stored as the low speed component LO2 (arrow $A_2$ in FIG. 2). The oxygen storage amount varies from the point $X_1$ to the point $X_2$.

When oxygen is released from the point $X_2$, oxygen is preferentially released from the high speed component HO2. When the ratio of the low speed component LO2 to the high speed component HO2 reaches the predetermined value ($X_3$ in FIG. 2), oxygen is released from both the high speed component HO2 and low speed component LO2 so that the ratio of the low speed component LO2 to the high speed component HO2 does not vary, i.e., oxygen is released while moving on a straight line L shown in the Figure. Here, on the line L, the low speed component is from 5 to 15, but preferably approximately 10, relative to the high speed component 1.

Returning to FIG. 1, the front A/F sensor 4 provided upstream of the catalyst 3 outputs a voltage according to the air-fuel ratio of the exhaust flowing into the catalyst 3. The rear oxygen sensor 5 provided downstream of the catalyst 3 detects whether the exhaust air-fuel ratio downstream of the catalyst 3 is rich or lean with the stoichiometric air-fuel ratio as a threshold value. Here, an economical oxygen sensor was provided downstream of the catalyst 3, but an A/F sensor which can detect the air fuel ratio continuously can be provided instead.

The cooling water temperature sensor 10 which detects the temperature of the cooling water is fitted to the engine 1. The detected cooling water temperature is used for determining the runing state of the engine 1, and also for estimating the catalyst temperature of the catalyst 3.

The controller 6 comprises a microprocessor, RAM, ROM and I/O interface, and it computes the oxygen storage amount of the catalyst 3 (high speed component HO2 and low speed component LO2) based on the output of the air flow meter 9, front A/F sensor 4 and cooling water temperature sensor 10.

When the high speed component HO2 of the computed oxygen storage amount is greater than a predetermined amount (e.g., half the maximum capacity HO2MAX of the (high speed component), the controller 6 makes the air fuel ratio of the engine 1 rich, makes the air-fuel ratio of the exhaust flowing into the catalyst 3 rich, and decreases the high speed component HO2. Conversely, when it is less than the predetermined amount, the controller 6 makes the air fuel ratio of the engine 1 lean, makes the air-fuel ratio of the exhaust flowing into the catalyst 3 lean, increases the high speed component HO2, and maintains the high speed component HO2 of the oxygen storage amount constant.

When the catalyst temperature on engine startup is high, and a large amount of oxygen has already been stored by the catalyst 3 (hereafter referred to as "hot restart"), in order to release all the oxygen stored by the catalyst 3 to ensure NOx purification performance, a rich shift of the air-fuel ratio is performed until the exhaust downstream of the catalyst 3 has been detected to be rich by the rear oxygen sensor 5.

A discrepancy may arise between the computed oxygen storage amount and real oxygen storage amount due to computational error, so the controller 6 resets the computational value of the oxygen storage amount with a predetermined timing based on the air-fuel ratio of the exhaust downstream of the catalyst 3, and corrects this discrepancy from the real oxygen storage amount.

Specifically, when it is determined that the air-fuel ratio downstream of the catalyst 3 is lean based on the output of the rear oxygen sensor 5, it is determined that at least the high speed component HO2 is maximum, and the high speed component HO2 is reset to maximum capacity. When it is determined by the rear oxygen sensor 5 that the air fuel ratio downstream of the catalyst 3 is rich, oxygen is no longer being released not only from the high speed component HO2 but also from the low speed component LO2, so the high speed component HO2 and high speed component LO2 are reset to minimum capacity.

Next, the control performed by the controller 6 will be described.

First, the computation of the oxygen storage amount will be described, followed by resetting of the computational value of the oxygen storage amount, and air-fuel ratio control of the engine 1 based on the oxygen storage amount.

Figure 3:
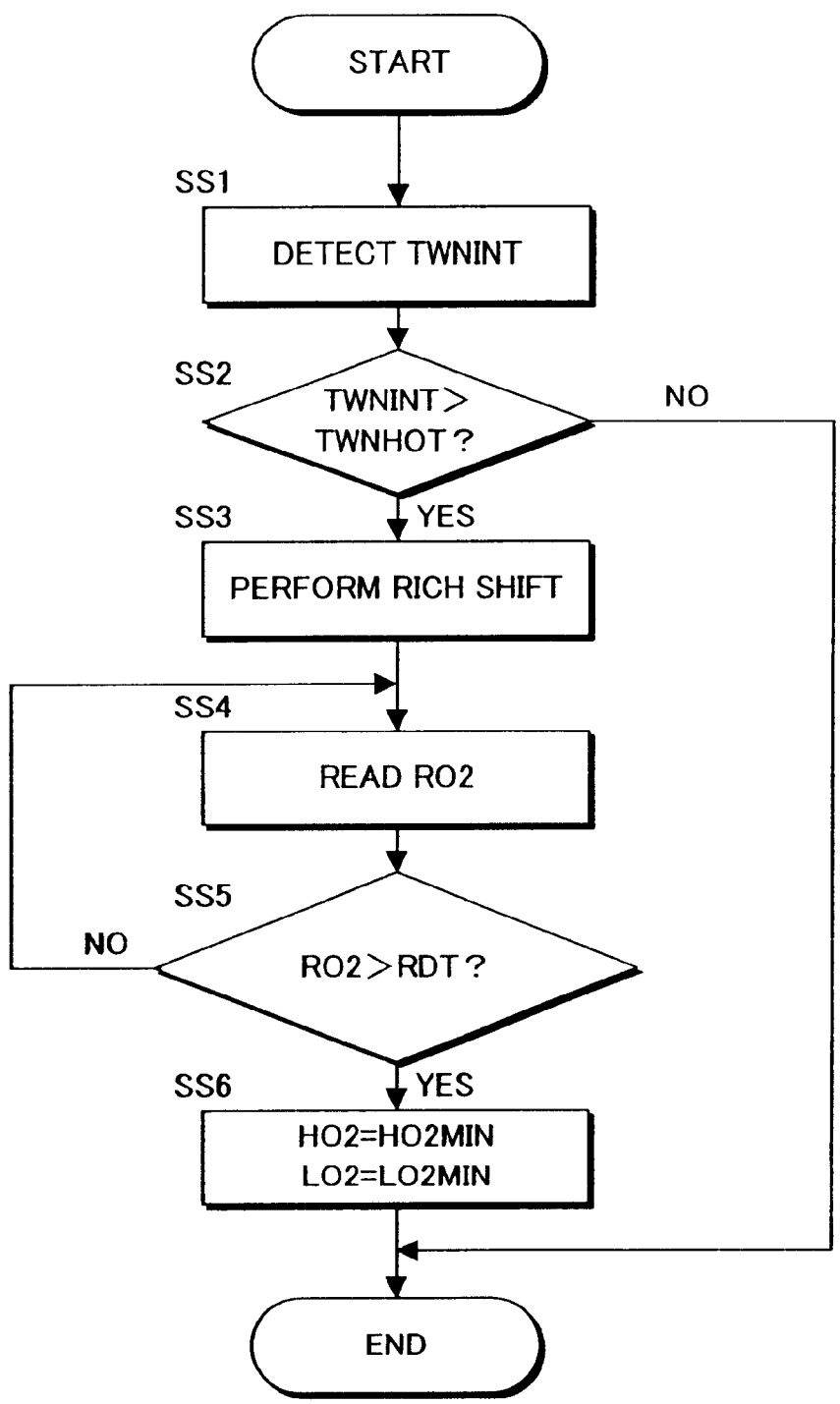
FIG. 3 is a flowchart showing the details of control performed on engine startup.
Figure 4:
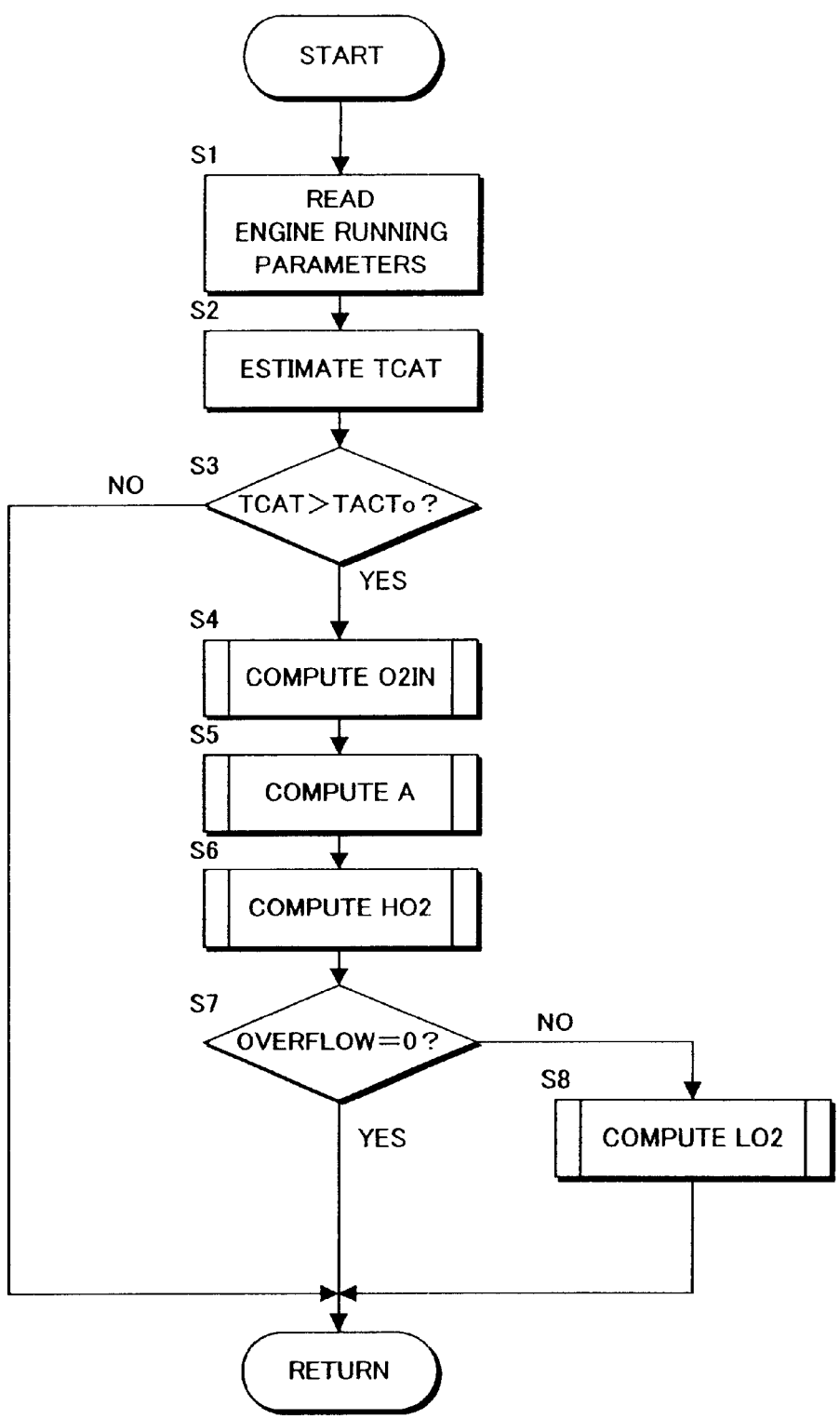
FIG. 4 is a flowchart showing a routine for computing an oxygen storage amount of the catalyst.

First, the startup control shown in FIG. 3 (first air-fuel ratio control) is performed, and when startup control has terminated, the routine for computing the oxygen storage amount shown in FIG. 4 is performed repeatedly.

FIG. 3 shows the details of the startup control. The startup control is performed only once on engine startup, for example, once after it is determined that the engine 1 has started properly.

According to this, firstly, the cooling water temperature TWNINT of the engine 1 on engine startup is detected based on the output of the cooling water temperature sensor 10 (step SS1), and it is determined whether or not the engine 1 has restarted in the state where warm-up is complete (hereafter referred to as "warmed-up state"), i.e., whether or not there is a hot restart, by comparing this with a hot restart determining threshold value TWNHOT (e.g., 60° C.) (step SS2).

When it is determined that the cooling water temperature TWNINT on engine startup is higher than the threshold value TWNHOT, and there is a hot restart, the routine proceeds to a step SS3, and a rich shift of the air-fuel ratio the engine 1 is performed to release the oxygen stored by the catalyst 3. The rich shift of the air-fuel ratio of the engine 1 is continued until an output RO2 of the rear oxygen sensor 5 exceeds a rich determining threshold RDT, i.e., until the exhaust downstream of the catalyst 3 becomes rich (steps SS4, SS5).

When the output RO2 of the rear oxygen sensor 5 exceeds the rich determining threshold RDT, the routine proceeds to a step SS6. At the time when the exhaust downstream of the catalyst 3 changes to rich, it may be considered that all the oxygen stored by the catalyst 3 has been released, so the computed values HO2, LO2 of the high speed component and low speed component of the oxygen storage amount are reset to the minimum capacities HO2MIN, LO2MIN.

On the other hand, when the cooling water temperature TWNINT on engine startup is lower than the threshold value TVNHOT and it is determined that there is no hot restart in the step SS2, startup control is then terminated.

The determination of the hot restart based on the cooling water temperature of the engine 1 on engine startup, may be performed based on the oil temperature of the engine 1. Alternatively, the temperature of the catalyst 3 on engine startup may be detected by a sensor, or estimated based on various running parameters of the engine) 1, and the determination of the hot restart may be performed based on the temperature of the catalyst 3 on engine startup. In this case, it is determined that there is a hot restart when the catalyst temperature on engine startup is higher than a predetermined threshold value (e.g., 300° C.).

When startup control is terminated, the routine for computing the oxygen storage amount of the catalyst 3 shown in FIG. 4 is performed at a predetermined interval.

According to this routine, first, in a step S1, the outputs of the cooling water temperature sensor 10, crank angle sensor 12 and air flow meter 9 are read as running parameters of the engine 1. In a step S2, a temperature TCAT of the catalyst 3 is estimated based on these parameters. In a step S3, by comparing the estimated catalyst temperature TCAT and a catalyst activation temperature TACTo (e.g., 300° C.), it is determined whether or not the catalyst 3 has activated.

When it is determined that the catalyst activation temperature TACTo has been reached, the routine proceeds to a step S4 to compute the oxygen storage amount of the catalyst 3. When it is determined that the catalyst activation temperature TACTo has not been reached, processing is terminated assuming that the catalyst 3 does not store or release oxygen.

In the step S4, a subroutine (FIG. 5) for computing an oxygen excess/deficiency amount O2IN is performed, and the oxygen excess/deficiency amount of the exhaust flowing into the catalyst 3 is computed. In a step S5, a subroutine (FIG. 6) for computing an oxygen release rate A of the high speed component of the oxygen storage amount is performed, and the oxygen release rate A of the high speed component is computed.

Further, in a step S6, a subroutine (FIG. 7) for computing the high speed component HO2 of the oxygen storage amount is performed, and the high speed component HO2 and an oxygen amount OVERFLOW overflowing into the low speed component LO2 without being stored as the high speed component HO2, are computed based on the oxygen excess/deficiency amount O2IN and the oxygen release rate A of the high speed component.

In a step S7, it is determined whether or not all of the oxygen excess/deficiency amount O2IN flowing into the catalyst 3 has been stored as the high speed component HO2 based on the overflow oxygen amount OVERFLOW When all of the oxygen excess/deficiency amount O2IN has been stored as the high speed component (OVERFLOW=0), processing is terminated. In other cases, the routine proceeds to a step S8, a subroutine (FIG. 8) is performed for computing the low speed component LO2, and the low speed component LO2 is computed based on the overflow oxygen amount OVERFLOW overflowing from the high speed component HO2.

Here, the catalyst temperature TCAT is estimated from the cooling water temperature of the engine 1, the engine load and the engine rotation speed, but a temperature sensor 11 may also be attached to the catalyst 3 as shown in FIG. 1, and the tenperature of the catalyst 3 measured directly.

When the catalyst temperature TCAT is less than the activation temperature TACTo, the oxygen storage amount is not computed, but the step S3 may be eliminated, and the effect of the catalyst temperature TCAT may be reflected in the oxygen release rate A of the high speed component or an oxygen storage/release rate B of the low speed component, described later.

Next, a subroutine performed from steps S4 to S6 and in the step S8 will be described.

Figure 5:
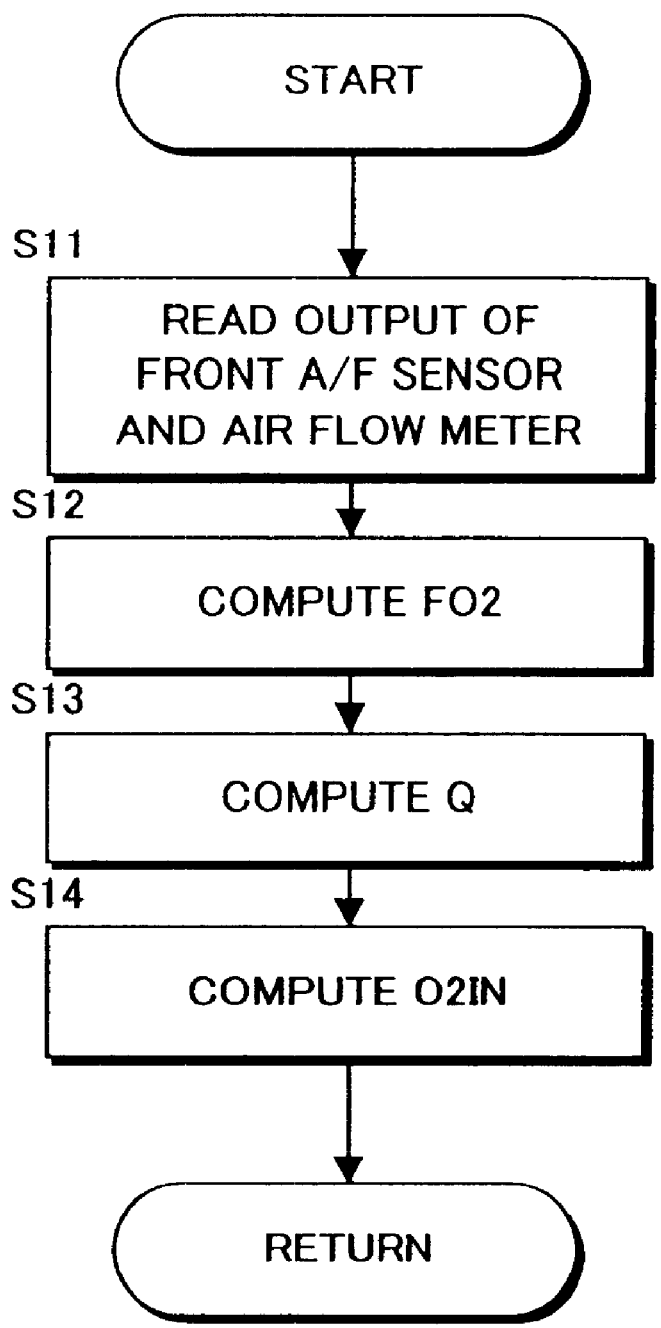
FIG. 5 is a flowchart showing a subroutine for computing an oxygen excess/deficiency amount in exhaust flowing into the catalyst.

FIG. 5 shows the subroutine for computing the oxygen excess/deficiency amount O2IN of the exhaust flowing into the catalyst 3. In this subroutine, the oxygen excess/deficiency amount O2IN of the exhaust flowing into the catalyst 3 is computed based on the air-fuel ratio of the exhaust upstream of the catalyst 3 and the intake air amount of the engine 1.

First, in a step S11, the output of the front A/F sensor 4 and the output of the air flow meter 9 are read.

Next, in a step S12, the output of the front A/F sensor 4 is converted to an excess/deficiency oxygen concentration FO2 of the exhaust flowing into the catalyst 3 using a predetermined conversion table. Here, the excess/deficiency oxygen concentration FO2 is a relative concentration based on the oxygen concentration at the stoichiometric air-fuel ratio. If the exhaust air-fuel ratio is equal to the stoichiometric air-fuel ratio, it is zero, if it is richer than the stoichiometric air-fuel ratio it is negative, and if it is leaner than the stoichiometric air-fuel ratio, it is positive.

In a step S13, the output of the air flow meter 9 is converted to an intake air amount Q using a predetermined conversion table, and in a step S14, the intake air amount Q is multiplied by the excess/deficiency oxygen concentration FO2 to compute the excess/deficiency oxygen amount O2IN of the exhaust flowing into the catalyst 3.

As the excess/deficiency oxygen concentration FO2 has the above characteristics, the excess/deficiency oxygen amount O2IN is zero when the exhaust flowing into the catalyst 3 is at the stoichiometric air-fuel ratio, a negative value when it is rich and a positive value when it is lean.

Figure 6:
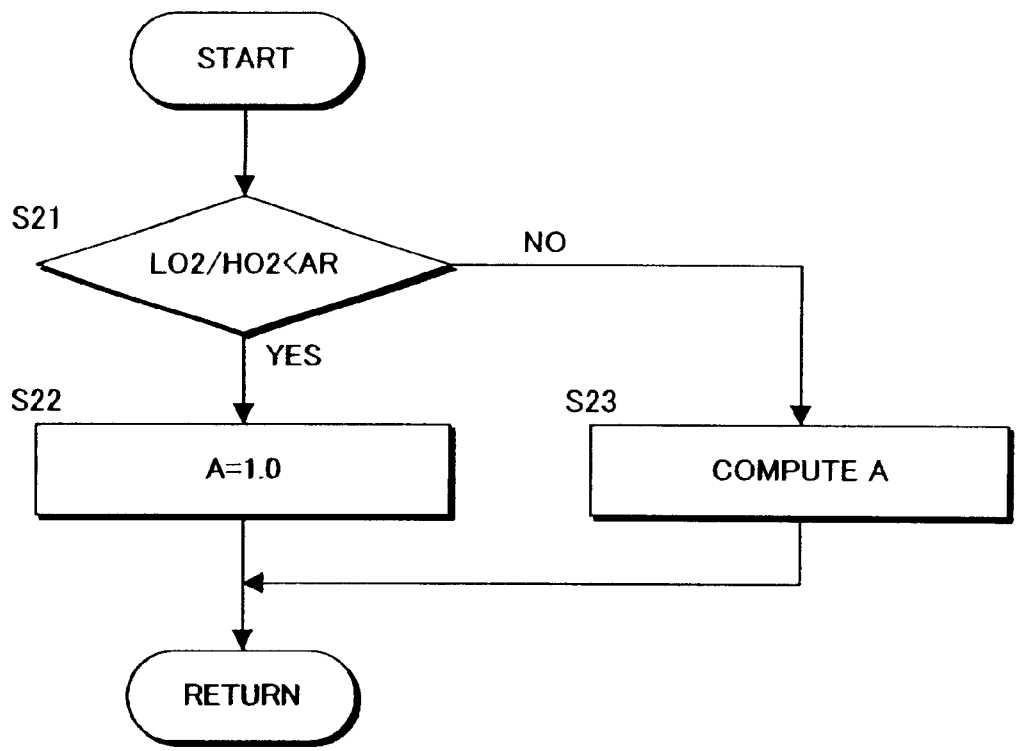
FIG. 6 is a flowchart showing a subroutine for computing an oxygen release rate of a high speed component.

FIG. 6 shows a subroutine for computing the oxygen release rate A of the high speed component of the oxygen storage amount. In this subroutine, as the oxygen release rate of the high speed component HO2 is affected by the low speed component LO2, the oxygen release rate A of the high speed component is computed according to the low speed component LO2.

First, in a step S21, it is determined whether or not a ratio LO2/HO2 of low speed component relative to the high speed component is less than a predetermined value AR. When it is determined that the ratio LO2/HO2 is less than the predetermined value AR, i.e., when the high speed component HO2 is relatively larger than the low speed component LO2, the routine proceeds to a step S22, and the oxygen release rate A of the high speed component is set to 1.0 expressing the fact that oxygen is released first from the high speed component HO2.

On the other hand, when it is determined that the ratio LO2/HO2 is not less than the predetermined value AR, oxygen is released from the high speed component HO2 and the low speed component LO2 so that the ratio of the low speed component LO2 to the high speed component HO2 does not vary. The routine then proceeds to a step S23, and a value of the oxygen release rate A of the high speed component is computed which does not cause the ratio LO2/HO2 to vary.

Figure 7:
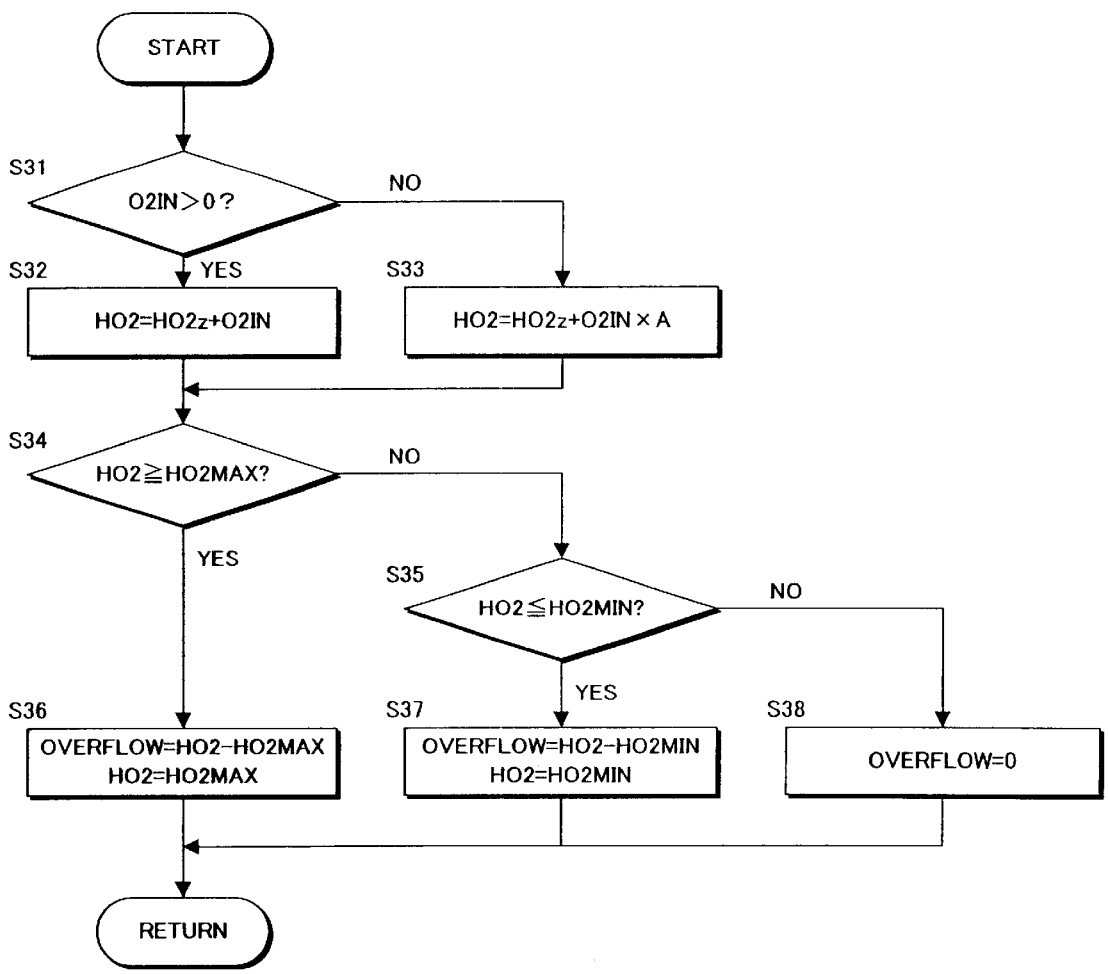
FIG. 7 is a flowchart showing a subroutine for computing the high speed component of the oxygen storage amount.

FIG. 7 shows a subroutine for computing the high speed component HO2 of the oxygen storage amount. In this subroutine, the high speed component HO2 is computed based on the oxygen excess/deficiency amount O2IN of the exhaust flowing into the catalyst 3 and the oxygen release rate A of the high speed component.

First, it is determined in a step S31 whether or not the high speed component HO2 is being stored or released based on the oxygen excess/deficiency amount O2IN.

When the air-fuel ratio of the exhaust flowing into the catalyst 3 is lean and the oxygen excess/deficiency amount O2IN is larger than zero, it is determined that the high speed component HO2 is being stored, the routine proceeds to a step S32, and the high speed component HO2 is computed from the following equation (1):

$$HO2=HO2z+O2IN \quad (1)$$

where: HO2z=value of high speed component HO2 on immediately preceding occasion.

On the other hand, when it is determined that the oxygen excess/deficiency amount O2IN is less than zero and the high speed component is being released, the routine proceeds to a step S33, and the high speed component HO2 is computed from the following equation (2):

$$HO2=HO2z+O2IN \times A \quad (2)$$

where: A=oxygen release rate of high speed component HO2.

In steps S34, S35, it is determined whether or not the computed HO2 exceeds the maximum capacity HO2MAX of the high speed component, or whether it is not less than a minimum capacity HO2MIN (=0).

When the high speed component HO2 is greater than the maximum capacity HO2MAX, the routine proceeds to a step S36, the overflow oxygen amount (excess amount) OVERFLOW flowing out without being stored as the high speed component HO2 is computed from the following equation (3):

$$OVERFLOW=HO2-HO2MAX \quad (3),$$

and the high speed component HO2 is limited to the maximum capacity HO2MAX.

When the high speed component HO2 is less than the minimum capacity HO2MIN, the routine proceeds to a step S37, the overflow oxygen amount (deficiency amount) OVERFLOW which was not stored as the high speed component HO2 is computed by the following equation (4):

$$OVERFLOW=HO2-HO2MIN \quad (4),$$

and the high speed component HO2 is limited to the minimum capacity HO2MIN. Here, zero is given as the minimum capacity HO2MIN, so the oxygen amount which is deficient when all the high speed component HO2 has been released is computed as a negative overflow oxygen amount.

When the high speed component HO2 lies between the maximum capacity HO2MAX and minimum capacity HO2MIN, the oxygen excess/deficiency amount O2IN of the exhaust flowing into the catalyst 3 is all stored as the high speed component HO2, and zero is set to the overflow oxygen amount OVERFLOW.

Here, when the high speed component HO2 is greater than the maximum capacity HO2MAX or less than the minimum capacity HO2MIN, the overflow oxygen amount OVERFLOW which has overflowed from the high speed component HO2 is stored as the low speed component LO2.

Figure 8:
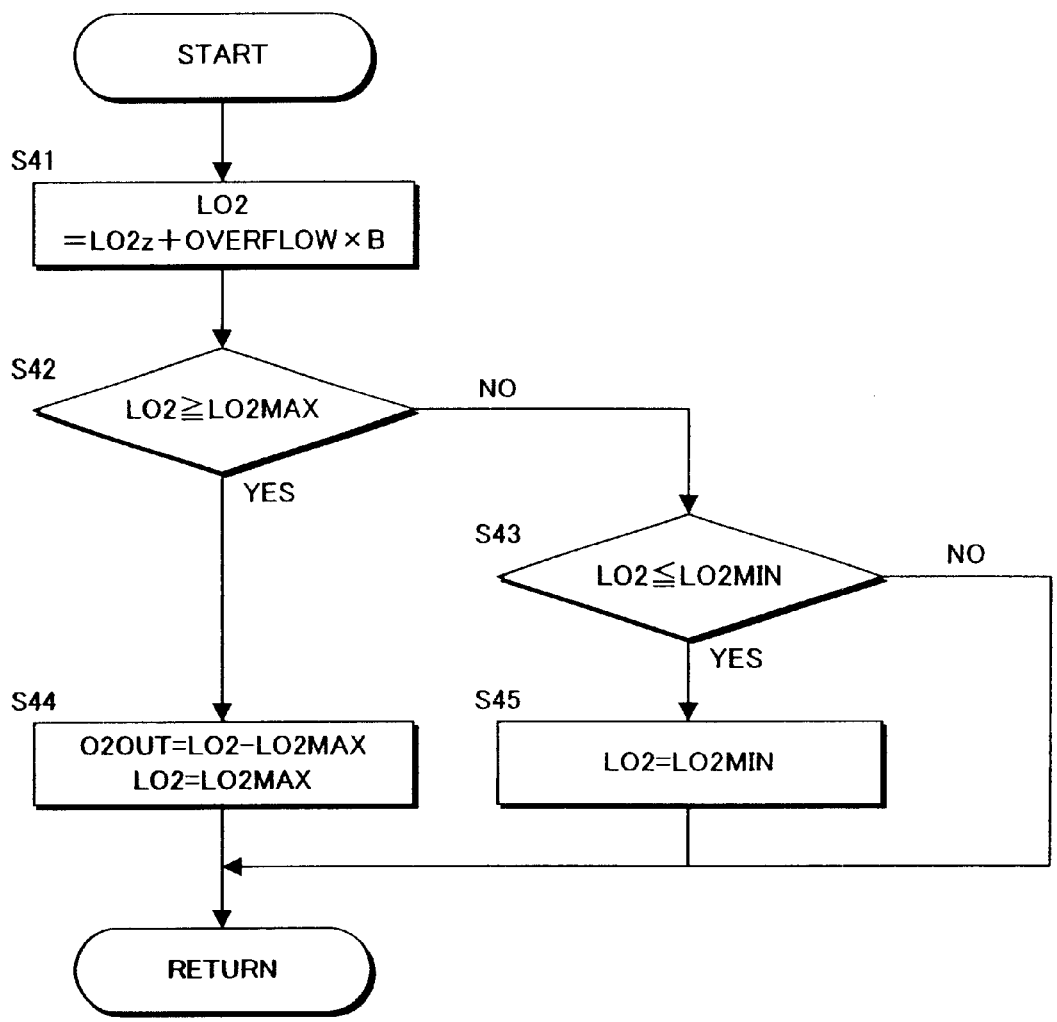
FIG. 8 is a flowchart showing a subroutine for computing a low speed component of the oxygen storage amount.

FIG. 8 shows a subroutine for computing the low speed component LO2 of the oxygen storage amount. In this subroutine, the low speed component LO2 is computed based on the overflow oxygen amount OVERFLOW which has overflowed from the high speed component HO2.

According to this, in a step S41, the low speed component LO2 is computed by the following equation (5):

$$LO2=LO2z+OVERFLOW \times B \quad (5)$$

where: LO2z=immediately preceding value of low speed component LO2, and

B=oxygen storage/release rate of low speed component.

Here, the oxygen storage/release rate B of the low speed component is set to a positive value less than 1, but actually has different characteristics for storage and release. Further, the real storage/release rate is affected by the catalyst temperature TCAT and the low speed component LO2, so the storage rate and release rate can be set to vary independently. In this case, when the overflow oxygen amount OVERFLOW is positive, oxygen is in excess, and the oxygen storage rate at this time is set to for example a value which is larger the higher the catalyst temperature TCAT or the smaller the low speed component LO2. Also, when the overflow oxygen amount OVERFLOW is negative, oxygen is deficient, and the oxygen release rate at this time may for example be set to a value which is larger the higher the catalyst temperature TCAT or the larger the low speed component LO2.

In steps S42, S43, in the same way as when the high speed component HO2 is computed, it is determined whether or not the computed low speed component LO2 has exceeded a maximum capacity LO2MAX or is less than a minimum capacity LO2MIN (=0).

When maximum capacity LO2MAX is exceeded, the routine proceeds to a step S44, an oxygen excess/deficiency amount O2OUT which has overflowed from the low speed component LO2 is computed from the following equation (6):

$$LO2OUT = LO2 - LO2MAX \tag{6}$$

and the low speed component LO2 is limited to the maximum capacity LO2MAX. The oxygen excess/deficiency amount O2OUT flows out downstream of the catalyst 3.

When the low speed component LO2 is less than the minimum capacity, the routine proceeds to a step S45, and the low speed component LO2 is limited to the minimum capacity LO2MIN.

Next, the resetting of the computed value of the oxygen storage amount performed by the controller 6 will be described. By resetting the computed value of the oxygen storage amount under predetermined conditions, computational errors which have accumulated so far are eliminated, and the computational precision of the oxygen storage amount can be improved.

Figure 9:
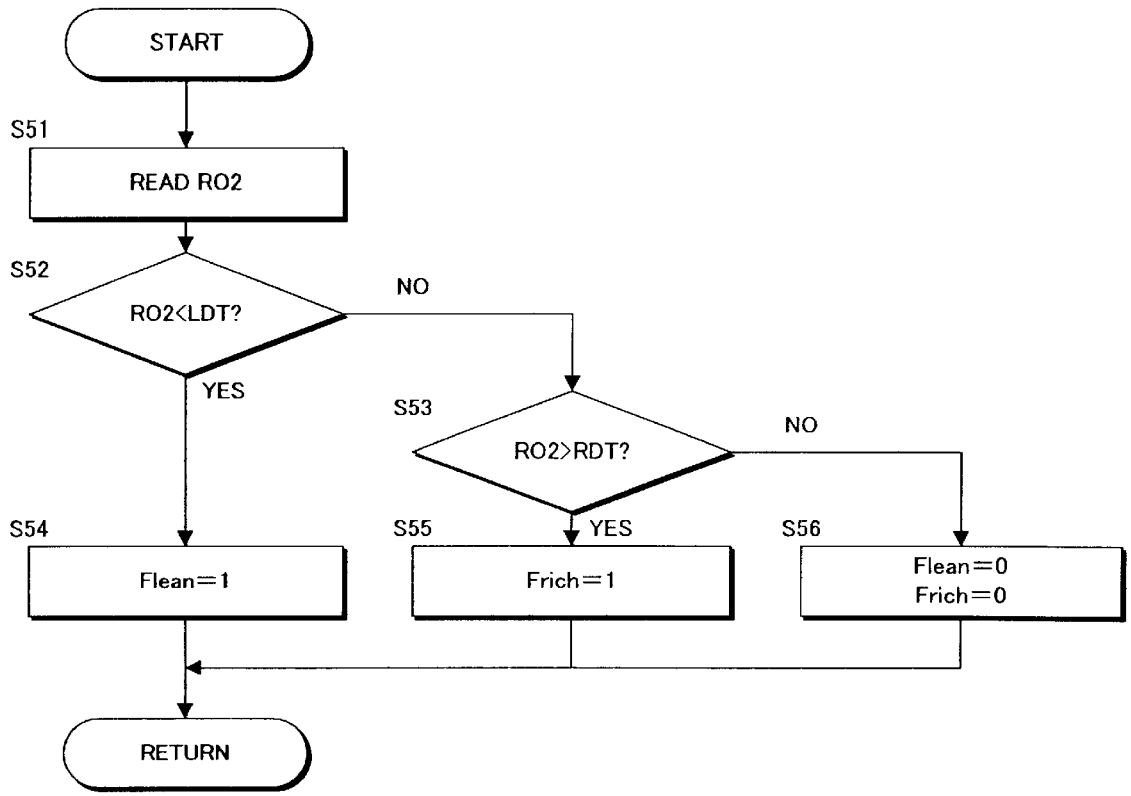
FIG. 9 is a flowchart showing a routine for determining a reset condition.

FIG. 9 shows the details of a routine for determining the reset condition. This routine determines whether or not a condition for resetting the oxygen storage amount (high speed component HO2 and low speed component LO2) holds from the exhaust air-fuel ratio downstream of the catalyst 3, and sets a flag Frich and a flag Flean.

First, in a step S51, the output of the rear oxygen sensor 5 which detects the exhaust air-fuel ratio downstream of the catalyst 3 is read. Subsequently, in a step S52, the rear oxygen sensor output RO2 is compared with a lean determining threshold LDT, and in a step S53, the rear oxygen sensor output RO2 is compared with the rich determining threshold RDT.

As a result of these comparisons, when the rear oxygen sensor output RO2 is less than the lean determining threshold LDT, the routine proceeds to a step S54, and the flag Flean is set to "1" showing that the lean reset condition for the oxygen storage amount holds. When the rear oxygen sensor output RO2 exceeds the rich determining threshold RDT, the routine proceeds to a step S55, and the flag Frich is set to "1" showing that the rich reset condition for the oxygen storage amount holds.

When the rear oxygen sensor output RO2 lies between the lean determining threshold LDT and rich determining threshold RDT, the routine proceeds to a step S56, and the flags Flean and Frich are set to "0" showing that the lean reset condition and rich reset condition do not hold.

Figure 10:
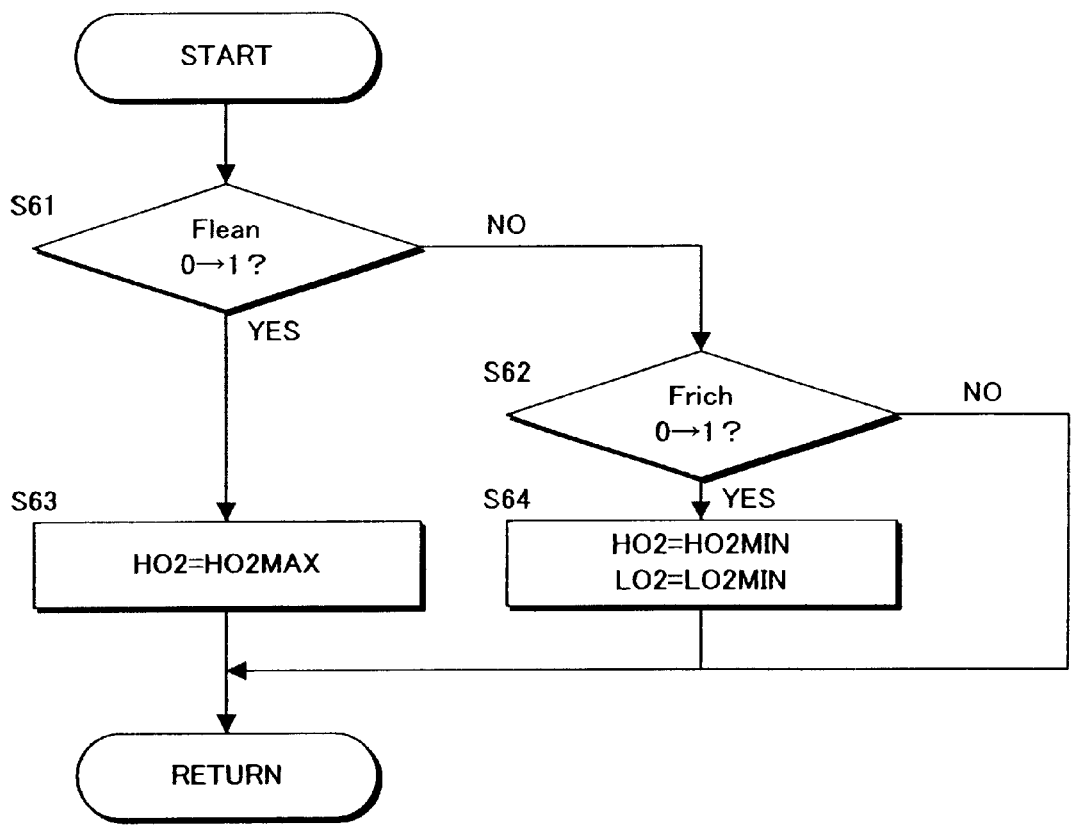
FIG. 10 is a flowchart showing a routine for performing reset of the computed oxygen storage amount.

FIG. 10 shows a routine for resetting the oxygen storage amount.

According to this, in steps S61, S62, it is determined whether or not the lean reset conditions or rich reset conditions hold based on the variation of the values of the flags Flean and Frich.

When the flag Flean changes from "0" to "1", and it is determined that lean reset conditions hold, the routine proceeds to a step S63, and the high speed component HO2 of the oxygen storage amount is reset to the maximum capacity HO2MAX. At this time, resetting of the low speed component LO2 is not performed. On the other hand, when the flag Frich changes from "0" to "1", and it is determined that rich reset conditions hold, the routine proceeds to a step S64, and the high speed component HO2 an low speed component LO2 of the oxygen storage amount are respectively reset to the minimum capacities HO2MIN, LO2MIN.

The reason why resetting is performed under these conditions is that as the oxygen storage rate of the low speed component LO2 is slow, oxygen overflows downstream of the catalyst even if the low speed component LO2 has not reached maximum capacity when the high speed component HO2 reaches maximum capacity and when the exhaust air-fuel ratio downstream of the catalyst becomes lean, it may be considered that at least the high speed component HO2 has reached maximum capacity.

When the exhaust air fuel ratio downstream of the catalyst becomes rich, oxygen is not released from the low speed component LO2 which is released slowly. Therefore, it may be considered that the high speed component HO2 and low speed component LO2 are both not being stored and are at minimum capacity.

Next, the air-fuel ratio control performed by the controller 6 (oxygen storage amount constant control) will be described.

Figure 11:
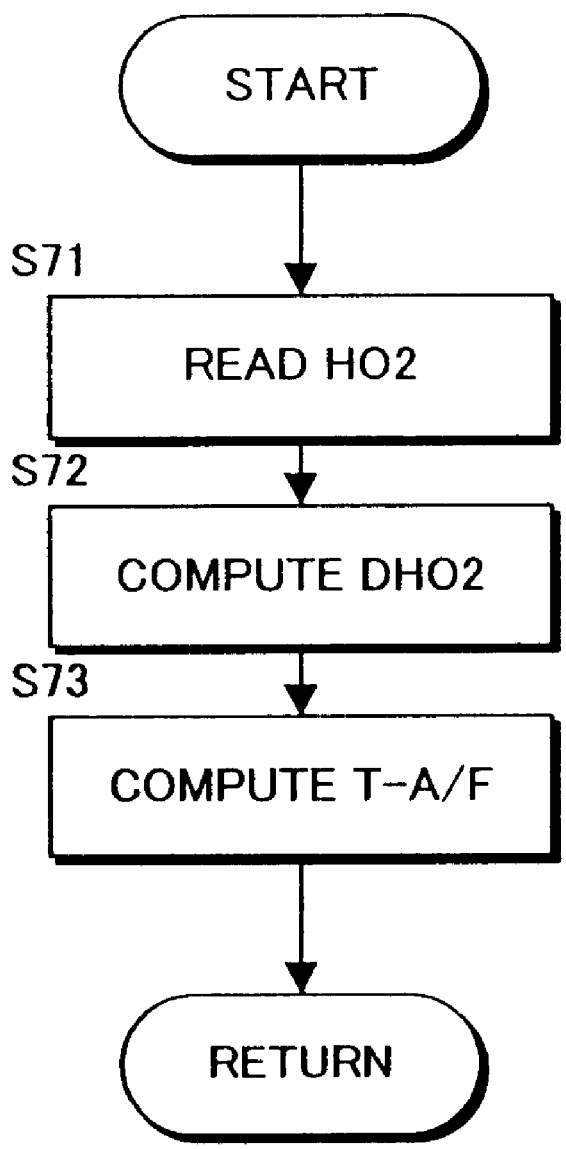
FIG. 11 is a flowchart showing a routine for computing a target air fuel ratio based on the oxygen storage amount.

FIG. 11 shows a routine for computing a target air fuel ratio based on the oxygen storage amount (second air-fuel ratio control).

According to this, in a step S71, the high speed component HO2 of the present oxygen storage amount is read. In a step S72, a deviation DHO2 (=oxygen excess/deficiency amount required by catalyst 3) between the current high speed component HO2 and a target value TGHO2 of the high speed component, is computed. The target value TGHO2 of the high speed component is set to, for example, half of the maximum capacity HO2MAX of the high speed component.

In a step S73, the computed deviation DHO2 is converted to an air-fuel ratio equivalent value, and a target air-fuel ratio T-A/F of the engine 1 is set.

Therefore, according to this routine, when the high speed component HO2 of the oxygen storage amount does not reach a target amount, the target air fuel ratio of the engine 1 is set to lean, and the oxygen storage amount (high speed component HO2) is increased. On the other hand, when the high speed component HO2 exceeds the target amount, the target air fuel ratio of the engine 1 is set to rich, and the oxygen storage amount (high speed component HO2) is decreased.

Next, the overall action performed by the above control will be described.

In the exhaust purification device according to this invention, when the engine 1 starts, the startup control is first performed.

When it is determined that there is a hot restart from the cooling water temperature on engine startup, the air-fuel ratio of the engine 1 is shifted to rich until the exhaust downstream of the catalyst 3 becomes rich and the oxygen stored by the catalyst 3 is all released.

When the oxygen amount already stored by the catalyst 3 is large in a hot restart, the catalyst atmosphere cannot be corrected to the stoichiometric air-fuel ratio when the air-fuel ratio of the exhaust flowing into the catalyst 3 has shifted to lean, and if the vehicle were to continue running, the NOx release amount would increase However, according to this invention, in a hot restart, the air-fuel ratio of the engine 1 is shifted to rich until the exhaust downstream of the catalyst 3 becomes rich, and all the oxygen stored by the catalyst 3 is released, and so the amount of NOx released on engine startup is suppressed. Further, the initial value of the oxygen storage amount is zero and it corresponds to the real oxygen storage amount, so the subsequent computational precision of the oxygen storage amount can be enhanced.

When the above startup control is terminated, computation of the oxygen storage amount of the catalyst 3 begins, and air fuel ratio control of the engine 1 is performed so that the oxygen storage amount of the catalyst 3 is constant to maintain the conversion efficiency of the catalyst 3 at a maximum.

The oxygen storage amount of the catalyst 3 is estimated based on the air-fuel ratio of the exhaust gas flowing into the catalyst 3 and the intake air amount, and computation of the oxygen storage amount is divided into the high speed component HO2 and low speed component LO2 according to the actual characteristics.

Specifically, the computation is performed assuming that when oxygen is stored, the high speed component HO2 is preferentially stored, and the low speed component LO2 begins to be stored when the high speed component HO2 can no longer be stored. The computation also assumes that when oxygen is released, when the ratio (LO2/HO2) of the low speed component LO2 and high speed component HO2 is less than the predetermined value AR, oxygen is preferentially released from the high speed component HO2, and when the ratio LO2/HO2 reaches the predetermined value AR, oxygen is released from both the low speed component LO2 and high speed component HO2 to maintain this ratio LO2/HO2.

When the high speed component HO2 of the computed oxygen storage amount is larger than the target value, the controller 6 decreases the high speed component by controlling the air-fuel ratio of the engine 1 to rich, and when it is less than the target value, the high speed component HO2 is increased by controlling the air-fuel ratio to lean.

As a result, the high speed component HO2 of the oxygen storage amount is maintained at the target value, and even if the air-fuel ratio of the exhaust flowing into the catalyst 3 shifts from the stoichiometric air-fuel ratio, oxygen is immediately stored as, the high speed component HO2 or immediately released as the high speed component HO2 which has a high responsiveness, the catalyst atmosphere is corrected to the stoichiometric air-fuel ratio, and the conversion efficiency of the catalyst 3 is maintained at a maximum.

Further, if computational errors accumulate, the computed oxygen storage amount shifts from the real oxygen storage amount, however the oxygen storage amount (high speed component HO2 and low speed component LO2) is reset with a timing at which the exhaust downstream of the catalyst 3 becomes rich or lean, and any discrepancy between the computed value and real oxygen storage amount is corrected.

Figure 12:
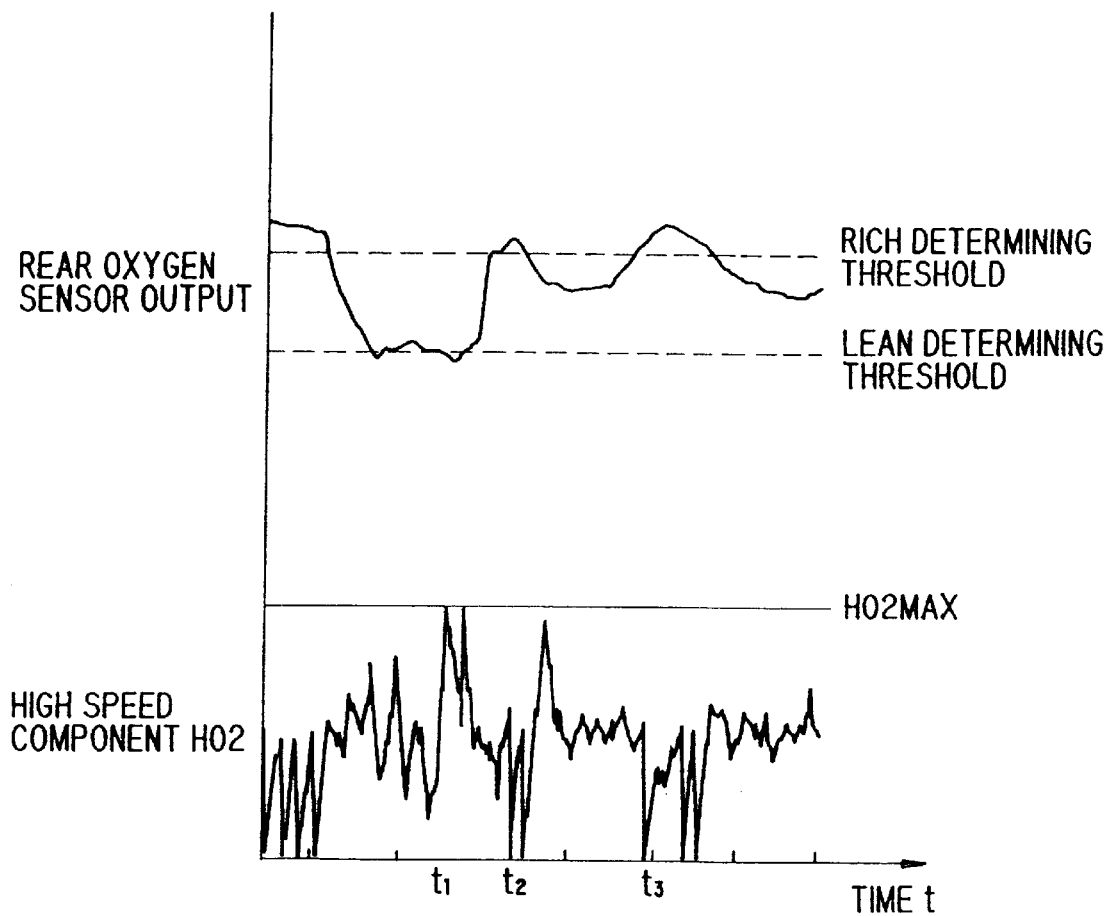
FIG. 12 is a diagram showing how a rear oxygen sensor output and high speed component vary when the oxygen storage amount is controlled to be constant.

FIG. 12 shows how the high speed component HO2 varies when the above oxygen storage amount constant control is performed.

In this case, at the time t1 the output of the rear oxygen sensor 5 becomes less than the lean determining threshold and lean reset conditions hold, so the high speed component HO2 is reset to the maximum capacity HO2MAX. However, the low speed component LO2 is not necessarily a maximum at this time, so reset of the low speed component is not performed, not shown.

At times t2, t3, the output of the rear oxygen sensor 5 becomes greater than the rich determining threshold and rich reset conditions hold, so the high speed component HO2 of the oxygen storage amount is reset to the minimum capacity (=0). The low speed component LO2 at this time is also reset to the minimum capacity, not shown.

Thus, resetting of the computed values of the oxygen storage amount is performed with a timing at which the air-fuel ratio of the exhaust downstream of the catalyst 3 becomes rich or lean, and as a result of the discrepancy from the real oxygen storage amount being corrected, the computational precision of the oxygen storage amount of the catalyst is further enhanced, the precision of air-fuel ratio control fir maintaining the oxygen storage amount constant is increased, and the conversion efficiency of the catalyst is maintained at a high level.

Figure 13:
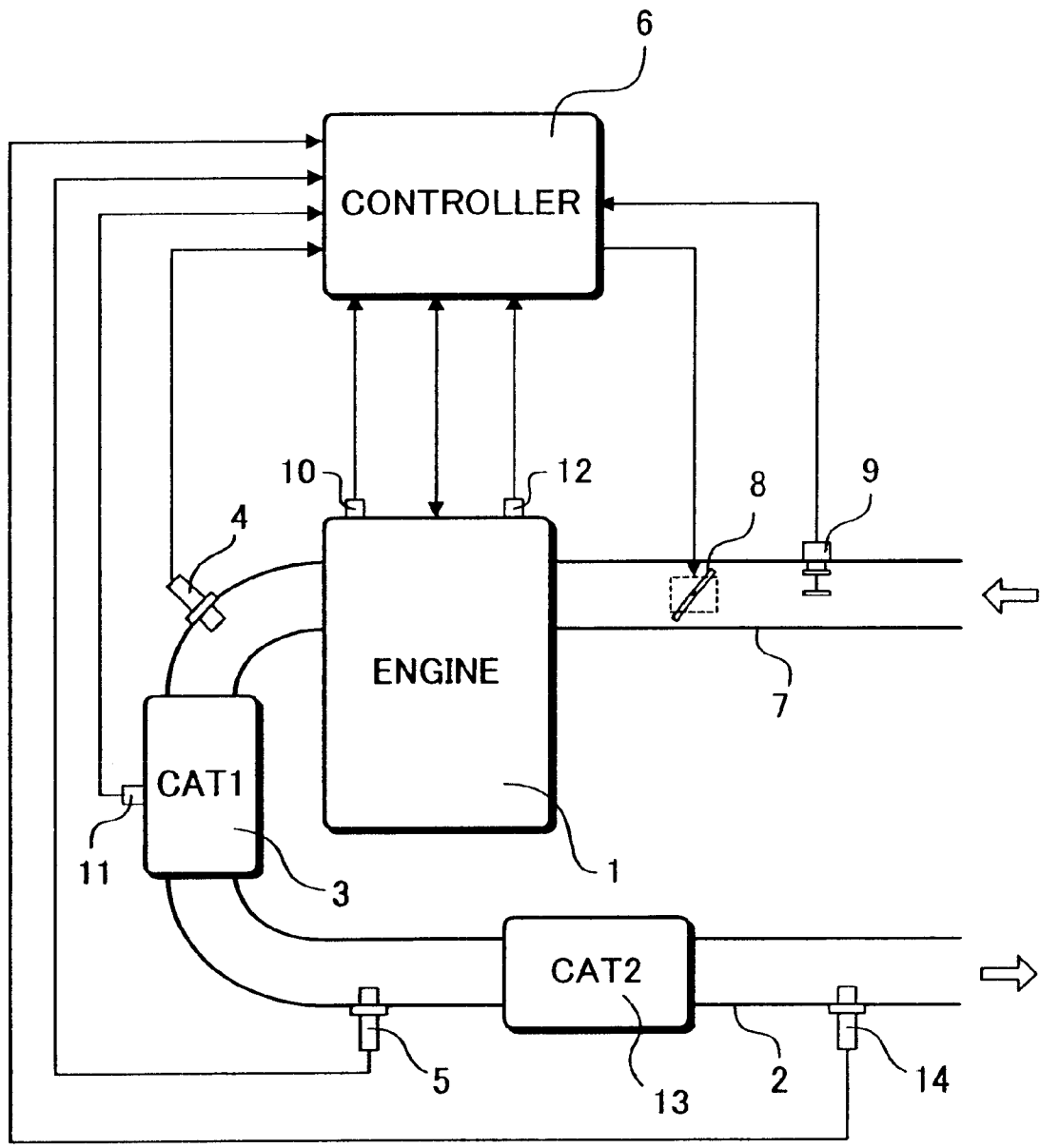
FIG. 13 is similar to FIG. 1, but showing a second embodiment of this invention.

FIG. 13 shows a second embodiment of this invention.

A second catalyst 13 (e.g., HC adsorption catalyst having a three-way catalyst function) is further provided downstream of the catalyst 3.

In this case, if the air-fuel ratio of the engine 1 is shifted to rich until it is detected that the exhaust downstream of the second catalyst has become rich by a second oxygen sensor 14 provided downstream of the second catalyst 13 in steps SS4, SS5 of FIG. 3, the oxygen stored by the catalyst 3 and the second catalyst 13 can be released at the same time. In this way, the NOx purification performance not only of the catalyst 3 but also of the second catalyst 13 situated further downstream can be maintained, and the NOx release amount immediately after startup can be suppressed.

According also to this embodiment, the oxygen storage amount of the catalyst 3 is computed separately as the high speed component and the low speed component by the processing shown from FIG. 4 to FIG. 8, and the air-fuel ratio of the engine 1 is controlled so that the high speed component is a target value (e.g., half of the maximum capacity HO2MAX).

Identical processing to that shown from FIG. 4 to FIG. 8 is performed for the second catalyst 13, and when the oxygen storage amount of the second catalyst 13 is computed separately for the high speed component and the low speed component, if the high speed component and low speed component of the oxygen storage amounts in the catalyst 3 and second catalyst 13 are respectively reset to the minimum capacities when it is detected by the second sensor 14, by an identical processing to the reset processing shown in FIG. 9 and FIG. 10, that the exhaust downstream of the second catalyst 13 has become rich, computational errors in the oxygen storage amounts of the catalyst 3 and second catalyst 13 can be eliminated.

The entire contents of Japanese Patent Applications P2000-44725 (filed Feb. 22, 2000) and P2001-38145 (filed Feb. 15, 2001) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. An exhaust purification device for an engine, comprising:
   a first catalyst provided in an exhaust passage of the engine,
   a front sensor which detects the characteristics of the exhaust flowing into the first catalyst, and a microprocessor programmed to:
  determine whether the engine starts up from a warmed-up state when the engine starts,
  control the air-fuel ratio of the engine to rich until the exhaust flowing out from the first catalyst has become rich when it is determined that the engine starts up from the warmed-up state,
  compute the oxygen storage amount of the first catalyst based on the characteristics of the exhaust flowing into the first catalyst, and
  control the air-fuel ratio of the engine based on the computed oxygen storage amount that the oxygen storage amount of the first catalyst is a target value.

2. An exhaust purification device as defined in claim 1, wherein the microprocessor is further programmed to determine that the engine starts up from the warmed-up state when the cooling fluid temperature of the engine on engine startup is higher than a predetermined temperature.

3. An exhaust purification device as defined in claim 1, wherein the microprocessor is further programmed to determine that the engine starts up from the warmed-up state when the temperature of the catalyst on engine startup is higher than a predetermined temperature.

4. An exhaust purification device as defined in claim 1, further comprising a first rear sensor which detects the characteristics of the exhaust flowing out of the first catalyst.

5. An exhaust purification device as defined in claim 1, wherein the microprocessor is further programmed to compute the oxygen storage amount of the first catalyst separately for a high speed component which has a fast storage/release rate and a low speed component which has a slower storage/release rate than the high speed component.

6. An exhaust purification device as defined in claim 5, wherein the microprocessor is further programmed to reset the computed values of the high speed component and low speed component to their minimum capacities when the exhaust flowing out of the first catalyst has become rich.

7. An exhaust purification device for an engine, comprising:
  a first catalyst provided in an exhaust passage of the engine,
  a second catalyst provided downstream of the first catalyst,
  a front sensor which detects the characteristics of the exhaust flowing into the first catalyst, and
  a microprocessor programmed to:
    determine whether the engine starts up from a warmed-up state when the engine starts,
    control the air-fuel ratio of the engine to rich until the exhaust flowing out from the second catalyst has become rich when it is determined that the engine starts from the warmed-up state,
    compute the oxygen storage amount of the first catalyst based on the characteristics of the exhaust flowing into the first catalyst, and
    control the air-fuel ratio of the engine based on the computed oxygen storage amount so that the oxygen storage amount of the first catalyst is a target value.

8. An exhaust purification device as defined in claim 7, further comprising a second rear sensor which detects the characteristics of the exhaust flowing out of the second catalyst.

9. An exhaust purification device for an engine, comprising:
  a first catalyst provided in an exhaust passage of the engine,
  means for detecting the characteristics of the exhaust flowing into the first catalyst,
  means for determining whether the engine starts up from a warmed-up state when the engine starts,
  means for controlling the air-fuel ratio of the engine to rich until the exhaust flowing out from the first catalyst has become rich when it is determined that the engine starts up from the warmed-up state,
  means for computing the oxygen storage amount of the first catalyst based on the characteristics of the exhaust flowing into the first catalyst, and
  means for controlling the air-fuel ratio of the engine based on the computed oxygen storage amount so that the oxygen storage amount of the first catalyst is a target value.

10. An exhaust purification device for an engine, comprising:
  a first catalyst provided in an exhaust passage of the engine,
  a second catalyst provided downstream of the first catalyst,
  means for detecting the characteristics of the exhaust flowing into the first catalyst,
  means for determining whether the engine starts up from a warmed-up state when the engine starts,
  means for controlling the air-fuel ratio of the engine to rich until the exhaust flowing out from the second catalyst has become rich when it is determined that the engine starts from the warmed-up state,
  means for computing the oxygen storage amount of the first catalyst based on the characteristics of the exhaust flowing into the first catalyst, and
  means for controlling the air-fuel ratio of the engine based on the computed oxygen storage amount so that the oxygen storage amount of the first catalyst is a target value.

11. A method for controlling an air-fuel ratio of an engine which has a first catalyst in an exhaust passage of the engine, comprising:
  determining whether the engine starts up from a warmed-up state when the engine starts,
  controlling the air-fuel ratio of the engine to rich until the exhaust flowing out from the first catalyst has become rich when it is determined that the engine starts up from the warmed-up state,
  computing the oxygen storage amount of the first catalyst based on the characteristics of the exhaust flowing into the first catalyst, and
  controlling the air-fuel ratio of the engine based on the computed oxygen storage amount so that the oxygen storage amount of the first catalyst is a target value.

* * * * *